Feb. 20, 1945.  M. J. MAGUIRE  2,370,058
FROTHING AGENT AND METHOD OF PRODUCTION
Filed Sept. 1, 1943
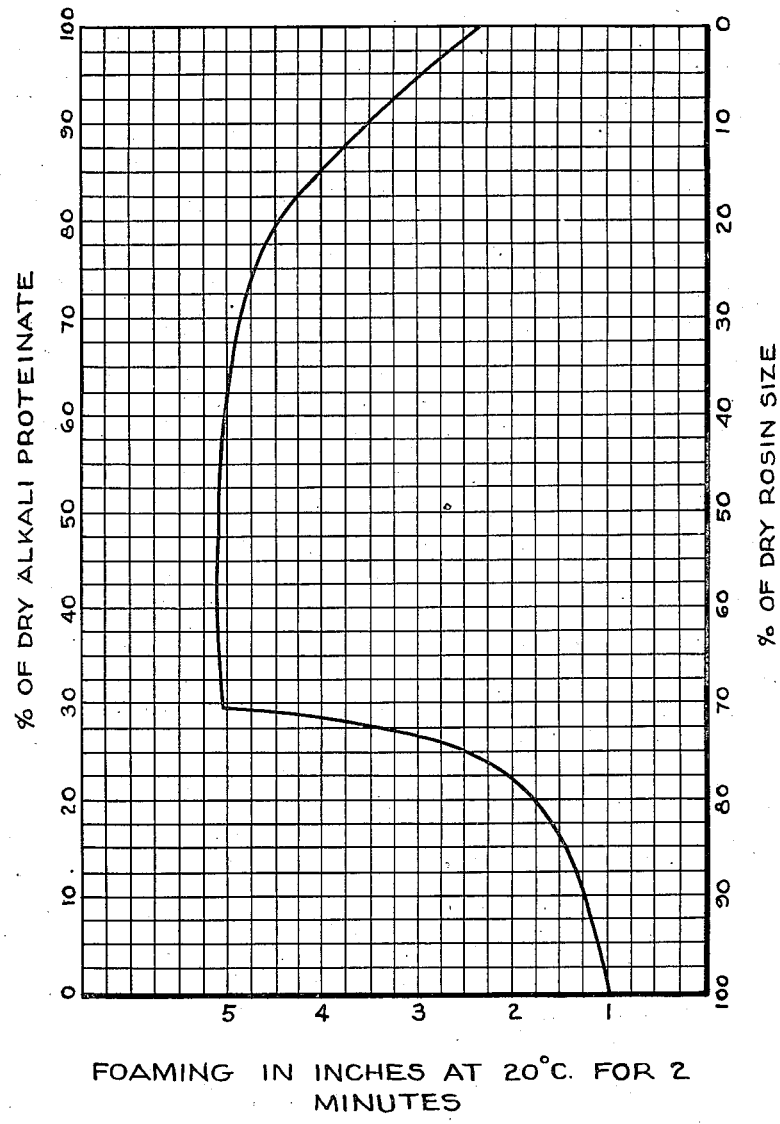
Milton J. Maguire
INVENTOR.
BY Cleveland B. Hallabaugh.
ATTORNEY Patented Feb. 20, 1945

2,370,058

UNITED STATES PATENT OFFICE 2,370,058

FROTHING AGENT AND METHOD OF PRODUCTION

Milton J. Maguire, South Hadley, Mass., assignor to Hercules Powder Company, Wilmington, Del., a corporation of Delaware Application September 1, 1943, Serial No. 500,816

10 Claims. (Cl. 252—356)

This invention relates to a frothing agent and method for its production. More particularly, it is concerned with a method of producing a dry frothing agent particularly adaptable for use in the manufacture of gypsum board, and the resulting product.

In the manufacture of gypsum board, it has been the general practice to mix a frothing agent with the gypsum to give a froth or foam and thereby lower the density of the gypsum board. Heretofore, there has been no attempt to produce a uniform product of specific foaming qualities, but rather the ingredients to make up the frothing agents are usually blended together as used. The principal criteria of excellence of a frothing agent is the ability to form foam and stability of the foam.

Now, in accordance with this invention, a method has been found of preparing an improved frothing agent which is especially adapted for use in gypsum board, by admixing together substantially neutral dry rosin size and dry alkali proteinate, in the ratio of from about 30:70 to about 70:30, and preferably from about 40:60 to about 60:40. The dry frothing agent can easily be dispersed by simply introducing the required amount of water. Thus, in accordance with this invention, a dry frothing agent is prepared comprising substantially neutral dry rosin size and dry alkali proteinate, in the ratio of from about 30:70 to 70:30, and preferably from about 40:60 to about 60:40. The resulting dry frothing agent is characterized by its ability to foam and stability of the foam in the presence of gypsum.

The critical nature of the above ratios of the substantially neutral dry size and dry alkali proteinate are illustrated by the accompanying drawing in which is shown a graph in which the percentage ratios of substantially neutral dry rosin size and dry alkali proteinate are compared. The results are measured as the inches of foam obtained in a foam tester when operated for 3 minutes at 2000 R. P. M.

Now, having indicated in a general way the nature and purpose of this invention, the following examples will illustrate the invention. In the examples, the ingredients are given in parts by weight, unless otherwise indicated.

Example 1

Dry frothing agents were prepared by admixing a commercial grade of neutral dry rosin size and dry potassium caseinate in the following proportions:

30% rosin size—70% potassium caseinate
50% rosin size—50% potassium caseinate
65% rosin size—35% potassium caseinate
70% rosin size—30% potassium caseinate These compositions were dissolved in water and diluted to 0.2% solids concentration. The solutions were each subjected to a 3-minute agitation in a foam tester at 2080 revolutions per minute at a temperature of 20° C. The evaluation of the ability to foam and stability of the foam of these compositions was as follows:

| Rosin size/caseinate ratio | Temp., °C. | R. P. M. stirrer | Inches foam after 3 min. | Inches after 7 min. rest |
|---|---|---|---|---|
| 30–70 | 20 | 2,080 | 4.9 | 2.6 |
| 50–50 | 20 | 2,080 | 5.0 | 2.6 |
| 65–35 | 20 | 2,080 | 5.1 | 2.7 |
| 70–30 | 20 | 2,080 | 3.5 | 1.0 |

Example 2

To evaluate the frothing agent of this invention when used with gypsum, the following tests were run in which a ratio of gypsum to frothing agent of 99:1 was used, and the whole diluted with water to 6.7% solids. The following dry frothing agents were prepared according to the method of Example 1.

50% rosin size—50% potassium caseinate
60% rosin size—40% potassium caseinate
70% rosin size—30% potassium caseinate These frothing agents were mixed with gypsum at a ratio of 99:1 and the whole diluted with water to 6.7% solids. The solutions were each subjected to a 3-minute agitation in a foam tester at 2060 revolutions per minute at a temperature of 30° C. The evaluation of ability to foam and stability of the foam when used with gypsum was as follows:

| Rosin size/caseinate ratio | Temp., °C. | R. P. M. stirrer | Inches foam after 3 min. | Inches after 7 min. rest |
|---|---|---|---|---|
| 50–50 | 30 | 2,060 | 7.5 | 7.0 |
| 60–40 | 30 | 2,060 | 6.8 | 6.3 |
| 70–30 | 30 | 2,060 | 6.0 | 5.7 |

Although potassium caseinate is shown in the examples, other dry alkali proteinates may be employed including those from casein and from the vegetable proteins, such as soybean protein.

The dry frothing agent may be prepared by thoroughly mixing together substantially neutral dry rosin size and dry alkali proteinate. The ratio of substantially neutral dry rosin size to dry alkali caseinate in the dry frothing agent may vary from about 30:70 to about 70:30, but preferably from about 40:60 to about 60:40. In practice, a ratio of 50:50 has been found especially suitable.

The protein may be neutralized by means of an alkali, such as sodium hydroxide, potassium hydroxide, and the like, by any of the methods known to the art, and the dry alkali proteinate prepared therefrom. Dry sodium or potassium caseinate, such as prepared by dissolving milk casein in aqueous sodium hydroxide or potassium hydroxide, and thereafter evaporating the resulting solution to dryness, or roller drying, has been found particularly suitable.

The rosin which is contained in the dry rosin size may be derived from any of the various grades of wood or gum rosin or the rosin acids contained therein as abietic acid, pimaric acid, sapinic acid, etc. The rosin may be neutralized by means of an alkali, such as sodium hydroxide, sodium carbonate, potassium hydroxide, potassium carbonate, etc.

The substantially neutral dry rosin size may be prepared by a number of methods, the most convenient of which is that described in U. S. Patent 2,134,911. Such method essentially comprises introducing a concentrated aqueous alkali solution into molten rosin contained in an autoclave, and heated to a temperature of about 275° F., after which the mixture is heated to about 375° F. and under autogenous pressure of the mixture until neutralization reaction is complete. The mixture is then discharged into a drying atmosphere under its own pressure, whereby it is instantly disiccated to a dry finely divided powder.

The dry frothing agents may be easily dispersed in water and diluted to the desired solids consistency, or, if preferred, such as when used in gypsum board, the dry frothing agent may be admixed with gypsum and the whole diluted to the desired solids consistency.

The dry frothing agent, prepared according to this invention, possesses many advantages over known frothing agents. For example, it may be stored and shipped in paper bags to the place of use, and as the dry frothing agent requires only dilution with water to disperse it, no technical skill is required, as is necessary with other frothing agents. Furthermore, this agent possesses not only the ability to produce a large amount of foam, but the stability of the foam is excellent. While this frothing agent is particularly adapted for use in gypsum board, it is not necessarily limited to this use. It may be used equally effectively in other products where frothing agents are required. By the use of this prepared composition, controlled frothing qualities can be obtained by regulating the ratio of casein to the rosin size within the operable ranges of this invention.

What I claim and desire to protect by Letters Patent is:

1. A frothing agent comprising substantially neutral dry rosin size and dry alkali proteinate in the ratio of about 30:70 to about 70:30, said frothing agent being characterized by ability to foam and stability of said foam in the presence of gypsum.

2. A frothing agent comprising substantially neutral dry rosin size and dry sodium caseinate in the ratio of about 30:70 to about 70:30, said frothing agent being characterized by ability to foam and stability of said foam in the presence of gypsum.

3. A frothing agent comprising substantially neutral dry rosin size and dry potassium caseinate in the ratio of about 30:70 to about 70:30, said frothing agent being characterized by ability to foam and stability of said foam in the presence of gypsum.

4. A frothing agent comprising substantially neutral dry rosin size and dry alkali proteinate in the ratio of from about 40:60 to about 60:40, said frothing agent being characterized by ability to foam and stability of said foam in the presence of gypsum.

5. A frothing agent comprising substantially neutral dry rosin size and dry sodium caseinate in the ratio of from about 40:60 to about 60:40, said frothing agent being characterized by ability to foam and stability of said foam in the presence of gypsum.

6. A frothing agent comprising substantially neutral dry rosin size and dry potassium caseinate in the ratio of from about 40:60 to about 60:40, said frothing agent being characterized by ability to foam and stability of said foam in the presence of gypsum.

7. A frothing agent comprising substantially neutral dry rosin size and dry sodium caseinate in the ratio of from 50:50, said frothing agent being characterized by ability to foam and stability of said foam in the presence of gypsum.

8. A frothing agent comprising substantially neutral dry rosin size and dry potassium caseinate in the ratio of from 50:50, said frothing agent being characterized by ability to foam and stability of said foam in the presence of gypsum.

9. A frothing agent comprising the dry sodium salt of rosin and dry sodium caseinate in the ratio of about 30:70 to about 70:30, said frothing agent being characterized by ability to foam and stability of said foam in the presence of gypsum.

10. A frothing agent comprising the dry sodium salt of rosin and dry potassium caseinate in the ratio of about 30:70 to about 70:30, said frothing agent being characterized by ability to foam and stability of said foam in the presence of gypsum.

MILTON J. MAGUIRE.